No. 681,421. Patented Aug. 27, 1901.
J. P. MALLETT.
SUPPORTING DEVICE FOR BRUSH HOLDERS.
(Application filed May 10, 1901.)

(No Model.) 2 Sheets—Sheet 1.

Witnesses.
Edward T. Wray.
Homer L. Krafft.

Inventor,
John P. Mallett
by Parker & Carter
Attorneys

No. 681,421. Patented Aug. 27, 1901.
J. P. MALLETT.
SUPPORTING DEVICE FOR BRUSH HOLDERS.
(Application filed May 10, 1901.)
(No Model.) 2 Sheets—Sheet 2.
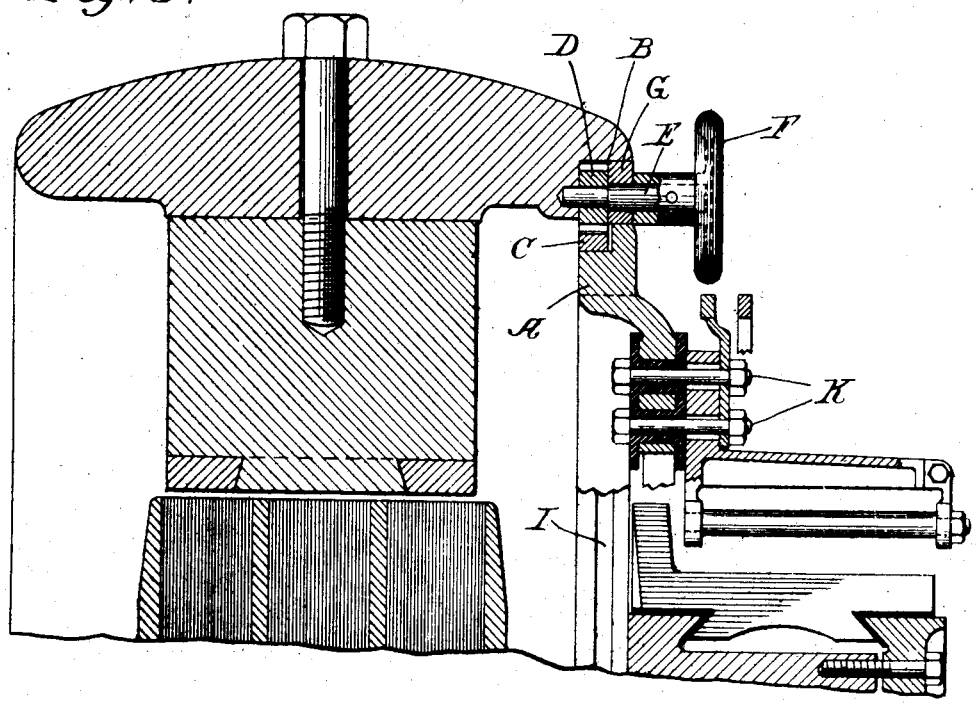
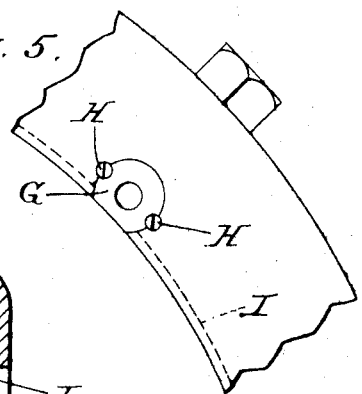
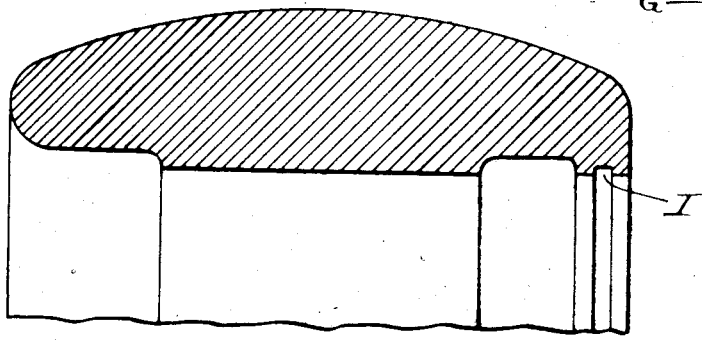
Witnesses.
Edward F. Wray.
Homer L. Kraft.
Inventor:
John P. Mallett
by Parker & Carter
Attorneys.

UNITED STATES PATENT OFFICE.

JOHN P. MALLETT, OF MADISON, WISCONSIN, ASSIGNOR TO NORTHERN ELECTRICAL MANUFACTURING COMPANY, OF SAME PLACE.

SUPPORTING DEVICE FOR BRUSH-HOLDERS.

SPECIFICATION forming part of Letters Patent No. 681,421, dated August 27, 1901.

Application filed May 10, 1901. Serial No. 59,559. (No model.)

*To all whom it may concern:*

Be it known that I, JOHN P. MALLETT, a citizen of the United States, residing at Madison, in the county of Dane and State of Wisconsin, have invented a certain new and useful Improvement in Supporting Devices for Brush-Holders, of which the following is a specification.

My invention relates to supporting devices for brush-holders for dynamo-electric machines, and has for its object to provide a new and improved supporting device of this description.

My invention is illustrated in the accompanying drawings, wherein—

Figure 1:
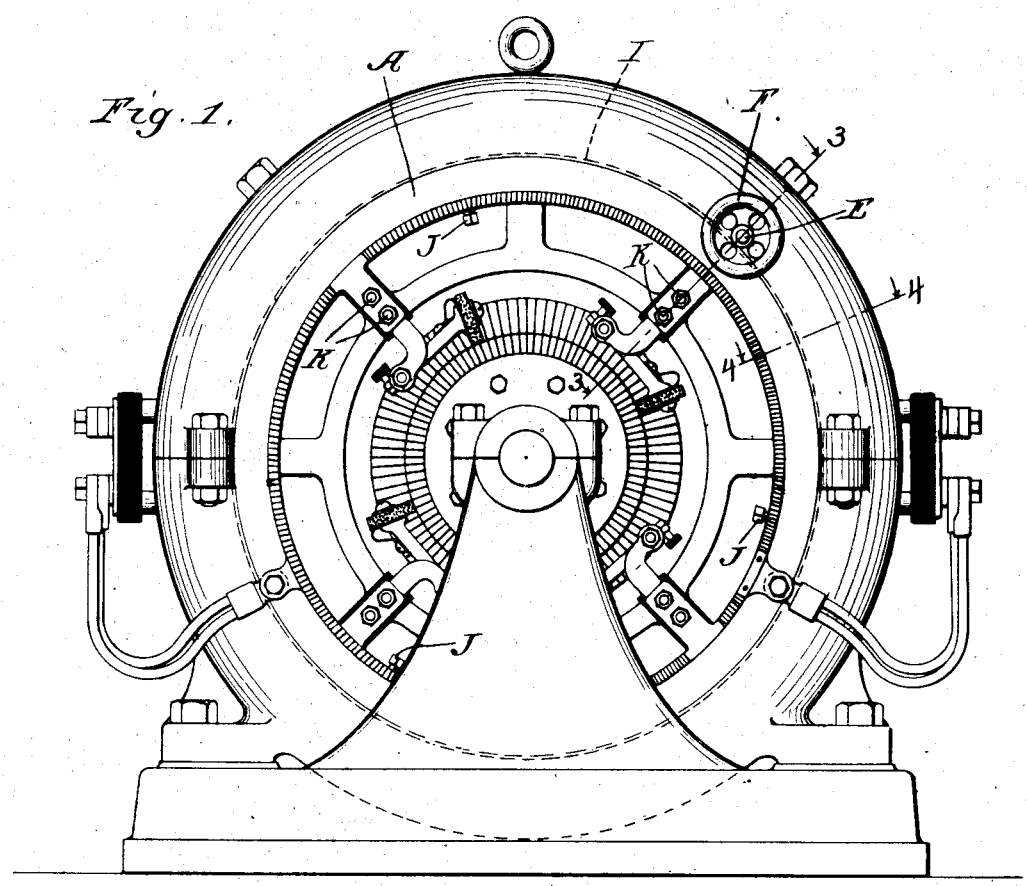
Figure 2:
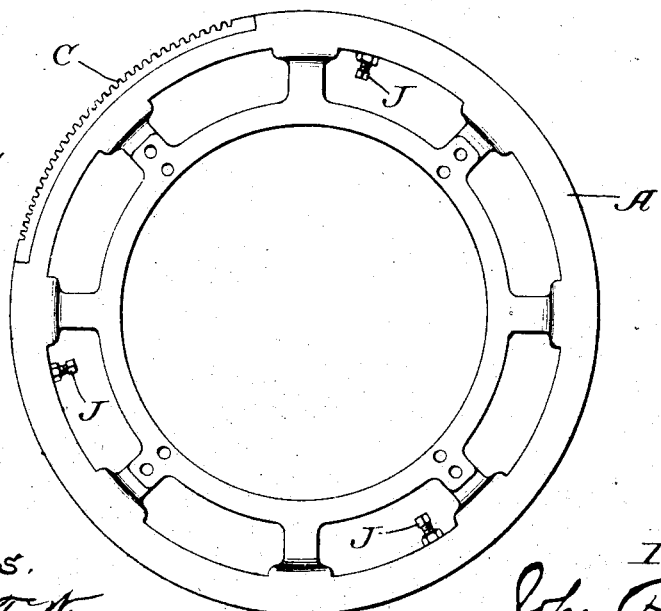

Figure 1 is a view of a machine with parts omitted, showing the brush-holder support in position. Fig. 2 is a view showing the brush-holder support detached from the machine. Fig. 3 is a section on line 3 3, Fig. 1. Fig. 4 is a similar section on line 4 4, Fig. 1. Fig. 5 is a view showing the bearing of the controlling hand-wheel.

Like letters refer to like parts throughout the several figures.

As herein illustrated the brush-holder support is mounted directly within the edge of the field-magnet frame.

In carrying out my invention I provide a brush-holder support or ring A, which extends around the armature-shaft, the brush-holders being connected therewith in any desired manner. This ring or support fits into a recess B in the field-magnet frame. Some suitable means is provided for adjusting the brush-holder support, so as to adjust the brushes to their proper position with relation to the commutator. In the construction illustrated the brush-holder support is provided with a rack C, which is engaged by a pinion D on the short spindle or shaft E, mounted in the field-frame and having the controlling hand-wheel F, by means of which it may be operated. In inserting the pinion and shaft in position the field-frame is bored or recessed and the shaft is provided with a bearing G, which fits into this recess and which is fastened in position in any desired manner, as by means of the screws H. It will thus be seen that the brush-support may be rotated to give it a proper adjustment by turning the hand-wheel, the pinion D engaging the rack C, as shown in Fig. 3.

The recessed face of the field-magnet frame is provided with the groove I, into which fit the ends of a series of set-screws J, passing through the brush-holder support. When it is desired to adjust the brush-holder support, these set-screws are loosened, and when the parts are properly adjusted they are again tightened, so as to hold the parts in this adjusted position. These set-screws prevent any lateral displacement of the brush-holder support while being adjusted and rigidly hold it in position after adjustment is made. This construction greatly facilitates the mounting of the brush-holder support and provides a compact arrangement, giving a perfect adjustment when desired and permitting the locking of the parts after the adjustment is completed. By forming the field-magnet frame with a recess the construction is cheapened and the strength, durability, and effectiveness increased. The brush-holders are connected to the brush-holder support by means of the bolts K and may be of any desired construction. It will also be seen that this construction permits the use of any desired number of brushes and their proper distribution about the commutator.

I have described in detail a particular construction to make my invention clear; but it is of course evident that the parts may be greatly varied in form, construction, and arrangement, and I therefore do not limit myself to the construction shown.

I claim—

1. The combination with the field-magnet frame of a dynamo-electric machine of a brush-holder support extending about the commutator and fitting into a recess in the field-frame, an adjusting device mounted in the field-frame and engaging said brush-holder support so as to vary its position, and means for locking the support in its adjusted position.

2. The combination with the field-magnet frame of a dynamo-electric machine, having a recess extending therearound, of a brush-holder-supporting ring fitting into said recess, a rack extending along a portion of the periphery of said supporting-ring, and a shaft mounted in the field-frame and carrying a pinion engaging said rack, so that the brush-holding ring may be adjusted.

3. The combination with the field-magnet frame of a dynamo-electric machine, having a recess extending therearound, of a brush-holder-supporting ring fitting into said recess, a rack extending along a portion of the periphery of said supporting-ring, a shaft mounted in the field-frame and carrying a pinion engaging said rack, so that the brush-holding ring may be adjusted, a continuous groove on the recessed face of the field-frame, and one or more set-screws projecting through the brush-holding ring into said groove.

4. A brush-holding device for dynamo-electric machines, comprising a brush-supporting ring extending around the commutator and fitting into a recess in the field-frame, a rack extending along a portion of the periphery of said brush-supporting ring, a pinion mounted in the recessed face of the field-frame, a shaft to which said pinion is connected mounted in a bearing removably attached to the field-magnet frame, whereby the brush-supporting ring may be adjusted to any desired position.

JOHN P. MALLETT.

Witnesses:
F. M. CONLEE,
A. J. BUENZLI.